United States Patent [19]

Keel et al.

[11] Patent Number: 4,992,901
[45] Date of Patent: Feb. 12, 1991

[54] SELF ALIGNED MAGNETIC POLES USING SACRIFICIAL MASK

[75] Inventors: Beat Keel, Prior Lake; Arthur Calderon, Minnetonka, both of Minn.; Simon Liao, Santa Barbara, Calif.

[73] Assignee: Seagate Technology, Inc., Scotts Valley, Calif.

[21] Appl. No.: 480,278

[22] Filed: Feb. 15, 1990

[51] Int. Cl.$^5$ .................. G11B 5/127; B44C 1/22; C03C 15/00; C23F 1/00

[52] U.S. Cl. ...................... 360/110; 29/603; 156/643; 156/653; 156/656; 156/659.1; 156/661.1; 156/667

[58] Field of Search ............ 156/643, 646, 652, 653, 156/656, 657, 659.1, 661.1, 667; 204/192.11, 192.12, 192.2, 192.3, 192.31, 192.32, 192.34, 192.35; 29/603; 360/110, 119–122, 126, 127; 427/130, 131, 132

[56] References Cited

U.S. PATENT DOCUMENTS

| | | | |
|---|---|---|---|
| 4,024,041 | 5/1977 | Hanazono et al. | 118/505 X |
| 4,226,018 | 10/1980 | Nakanishi et al. | 29/603 |
| 4,422,117 | 12/1983 | Nomura et al. | 360/126 |
| 4,436,593 | 3/1984 | Osborne et al. | 204/15 |
| 4,550,353 | 10/1985 | Hitai et al. | 156/656 X |
| 4,592,801 | 6/1986 | Hara et al. | 156/643 |
| 4,791,719 | 12/1988 | Kobayashi et al. | 29/603 |
| 4,912,584 | 3/1990 | Mallary et al. | 360/126 |

Primary Examiner—William A. Powell
Attorney, Agent, or Firm—Kinney & Lange

[57] ABSTRACT

In a method of manufacturing a thin film magnetic head having aligned top and bottom pole tip pieces, a sacrificial mask protects the upper pole tip while the exposed non-aligned portions of the gap material and lower pole tip are removed. The sacrificial mask is deposited using a self alignment technique.

52 Claims, 3 Drawing Sheets

SELF ALIGNED MAGNETIC POLES USING SACRIFICIAL MASK

BACKGROUND OF THE INVENTION

Reference to Co-Pending Applications

Reference is hereby made to the following co-pending patent applications filed on even date herewith and assigned to the same assignee "TOP POLE PROFILE FOR POLE TIP TRIMMING" Ser. No. 07/480,250; and filed Feb. 15, 1990 "METHOD FOR TIPS IN A THIN FILM HEAD" Ser. No. 07/480,558, filed Feb. 15, 1990.

1. Field of the Invention

The present invention relates to production of thin film magnetic heads. In particular, the invention relates to aligning the upper and lower pole tips in a thin film magnetic head using a sacrificial mask layer in which only the gap material and bottom pole are milled.

2. Description of the Prior Art

Thin film magnetic read/write heads are used for magnetically reading and writing information upon a magnetic storage medium such as a magnetic disk or magnetic tape. It is highly desirable to provide a high density of information storage on the magnetic storage medium.

Increased storage density in a recording system may be achieved by providing an areal density as high as possible for a given recording surface. In the case of rotating disk drives (both floppy and hard disk), the areal density is found by multiplying the number of flux reversals per unit length along the track (linear density in units of flux reversals per inch) by the number of tracks available per unit length in the radial direction (track density in units of tracks per inch).

As track densities have approached and exceeded 2400 tracks per inch, the alignment between the upper and lower pole tips in thin film magnetic read/write heads has become critical. At such a high storage density, design criteria require magnetic transducers in which the bottom pole tip width is very nearly the same as the top pole tip width. Top and bottom poles should also be in close alignment.

A technique which provides better pole alignment begins with a top pole, bottom pole and a gap area separating the top and bottom poles, all fabricated substantially wider than desired A narrower mask layer is then deposited upon the upper pole. The structure is then aligned using a material removal process ("milling") such as ion milling or reactive ion milling in which high energy ions bombard the pole tip region to remove the excess material (top pole, bottom pole and gap material) that extends beyond the edges of the masking layer. The mask layer protects only a portion of the top pole, bottom pole and gap so that the width of the completed pole tips is approximately the same as the width of the mask layer.

The noted alignment technique is both slow and capital intensive. For example, assuming a top pole thickness of 4 microns, a bottom pole thickness of 3 microns and gap thickness of 0.5 microns, and further assuming the gap layer material has a milling rate about one-half the milling rate of the pole tip layers, the total shaping time is about 8 units of time. This is calculated with the formula: milling time = layer thickness × milling rate. For this example $(4 \times 1) + (3 \times 1) + (0.5 \times 2) = 8$ units of time.

SUMMARY OF THE INVENTION

The present invention provides closely aligned pole tips in a thin film magnetic transducer which allow increased data storage densities. In the present invention only two layers (the gap material layer and the top pole layer) are milled into alignment.

Using the present invention, a first lower pole tip is deposited. Next, gap material is deposited upon the lower pole tip. Two photoresist dams are then deposited upon the gap material. The separation between the two photoresist dams will define the width of the top pole and, ultimately, the width of the gap material and the bottom pole. The top pole is deposited upon the gap material in the region between the two photoresist dams. Top and bottom pole thickness (i.e. film depth) typically ranges from about one micron to about five microns. The gap material thickness may typically range from about 0.1 microns to about one micron.

Finally, a sacrificial mask is deposited upon the top layer between the photoresist dams, and the photoresist dams are then etched away from the poles. The total thickness of the sacrificial mask ranges from about one micron to about seven microns depending upon the milling rate and thickness of the bottom pole.

The sacrificial mask is aligned with the upper pole because the mask is formed between the same two photoresist dams that are used to form the top pole. When the structure is milled, the exposed gap material and bottom pole are removed while the mask protects the top pole. The mask thickness and milling rate must be such that the top pole is sufficiently protected during the milling process. Following milling, the exposed portions of the gap material and bottom pole have been removed such that the top pole, gap and bottom pole are of substantially the same width and in alignment with each other.

The bottom pole and gap material may be deposited using a pattern such that the bottom pole and gap are somewhat wider than the top pole and mask prior to the milling step. Alternatively, the bottom pole and gap material may be of "infinite width" and deposited across a much wider area. Possible mask layers include copper, nickel iron (NiFe), and nickel phosphorus (NiP). The technique may be used with any platable mon-magnetic metal. Useful material removal techniques include ion milling, reactive ion milling, sputter etching and chemical etching The present invention can also be used in magnetic heads which have a bottom pole of infinite width where the bottom pole is actually formed in the substrate material.

With the present invention, the milling time is reduced and the sacrificial mask is thinner because only two layers (the gap material and bottom pole) must be milled away leaving the top pole substantially intact.

DETAILED DESCRIPTION OF THE PREFERRED EMBODIMENT

The demand for increased storage density in magnetic storage media has lead to reduced magnetic head dimensions. Magnetic heads are now fabricated in a manner similar to that used for semiconductor integrated circuits in the electronic industry. Many thin film heads are deposited across a wafer or substrate using etching and photolithographic techniques. The wafer may then be sliced into many microscopic individual magnetic heads for use with magnetic storage devices such as magnetic disks.

At these small dimensions, alignment between the pole tip of a head becomes critical, particularly as dimensions of the pole tip approach the tolerance and definition limits of the deposition techniques. Using the sacrificial masking technique of the present invention, problems associated with tolerance deficiencies are overcome. The present invention offers both time and cost savings over prior art alignment techniques.

Figure 1:
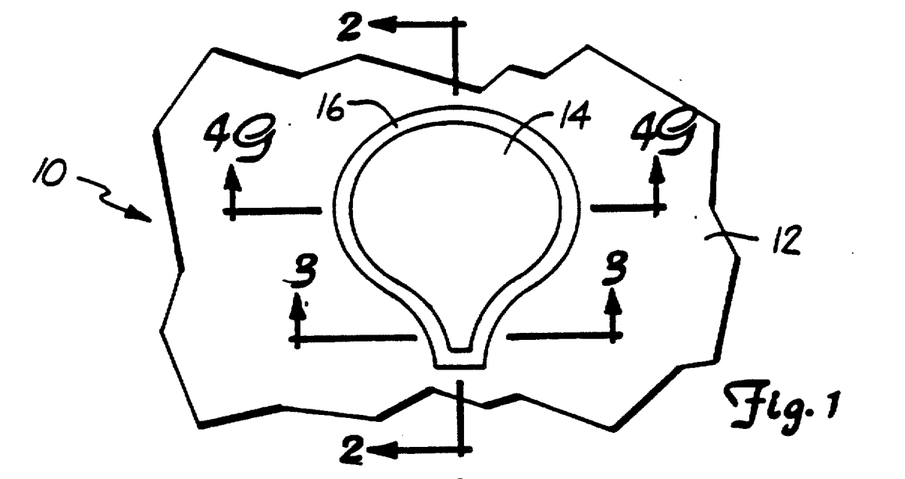
FIG. 1 shows a top view of the thin film magnetic read/write head of the present invention prior to the step of milling the excess gap material and lower pole tip.

FIG. 1 shows a top view of a thin film magnetic head 10 in accordance with the present invention prior to removal of the sacrificial mask layer. FIG. 1 includes a substrate 12, upper pole piece 14 having a paddle shape and lower layers indicated collectively at 16. Substrate 12 typically comprises a ceramic compound such as $Al_2O_3$—TiC. The thin film head of FIG. 1 is shown in cross section in FIG. 2 along line 2—2 in FIG. 1. Upper pole piece 14 is shown covered with two sacrificial mask layers 18 and 20 in FIG. 2. Upper pole 14 includes upper pole tip 22. Magnetic thin film read/write head 10 also includes lower pole 24 having lower pole tip 26. Upper and lower poles 14 and 24 are formed by magnetic thin films such as NiFe, for example. The area between upper pole 14 and lower pole 24 is filled with insulator 28. Embedded within insulator 28 are conductors 30 and 32. The area between upper pole tip 22 and lower pole tip 26 is filled with gap material 34. Gap material 34 typically comprises $Al_2O_3$.

Figures 2, 3:
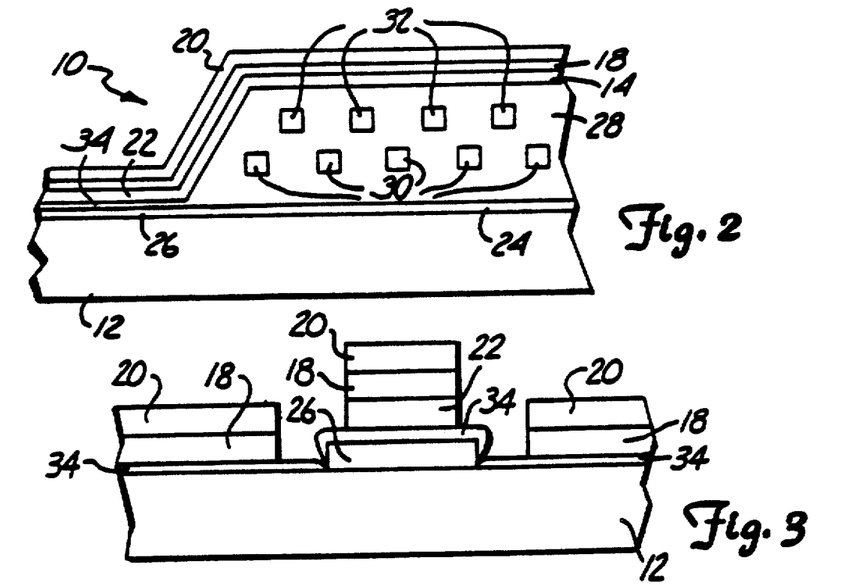
FIG. 2 is a side cross sectional view of the thin film magnetic transducer of FIG. 1 taken along line 2—2.
FIG. 3 is a cross sectional view of the thin film magnetic head of FIG. 1 taken along line 3—3 in FIG. 1.

Upper pole 14 and lower pole 24 contact each other at a back gap "via" (not shown) and form the two poles of a magnetic head. Conductors 30 and 32 are formed in a coil through the region between upper pole 14 and lower pole 24 and extend around the back gap via (not shown). As current is caused to flow through conductors 30 and 32, a magnetic field is induced in upper and lower poles 14 and 24. This magnetic field extends between upper and lower pole tips 22 and 26 and through gap material 34. Depending upon the design of upper and lower pole tips 22 and 26, a magnetic fringe field is formed extending beyond the boundaries of upper and lower pole tips 22 and 26. If a magnetic storage medium is passed through this fringe field, the magnetic flux emanating from pole tips 22 and 26 will impress a magnetic field upon the medium's surface. Conversely, if a magnetic field, such as that produced by a magnetic storage medium, is passed through the fringe field region of thin film head 10, a magnetic field will be induced in upper and lower poles 14 and 24 and through the back gap via (not shown). This changing magnetic field will induce an electric current to flow through conductors 30 and 32. The electric current is then sensed using electrical equipment and converted into an information signal to recover information stored upon the magnetic storage medium.

FIG. 3 shows a cross sectional view of thin film head 10 along line 3—3 in FIG. 1. FIG. 3 shows a front cross sectional view of the pole tip region of FIG. 2. FIG. 3 shows sacrificial mask layers 18 and 20 covering the upper pole tip 22 while leaving a portion of gap material 34 and lower pole tip 26 uncovered or exposed. Sacrificial mask layers 18 and 20 may comprise nickel iron, copper or nickel phosphorus. As explained below, a milling process removes the exposed gap material 34 and lower pole tip 26 along with sacrificial mask layers 18 and 20 to leave upper pole tip 22 intact along with the protected portion of gap material 34 and lower pole tip 26. Typically gap layer 34 may range in thickness between about 0.1 microns and about one micron, pole tips 22 and 26 between about one micron and about five microns, and total sacrificial mask thickness from about one micron to about seven microns.

FIGS. 4A–4H detail the steps used to form the structure of FIG. 3 having sacrificial mask layers 18 and 20 aligned with upper pole tip 22.

Figure 4A:
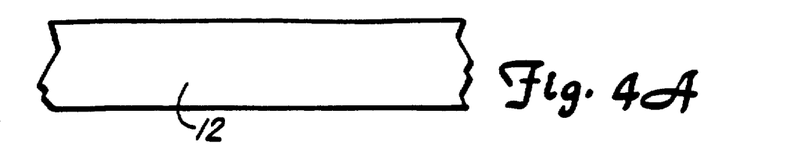
FIGS. 4A–4H illustrate steps used in forming the thin film magnetic read/write head of the present invention.

FIG. 4A shows a cross section view of substrate 12 upon which the deposition process takes place. Substrate 12 is generally very large relative to thin film head 10 so that many replicas of head 10 may be deposited across the entire surface of substrate 12.

Figure 4B:
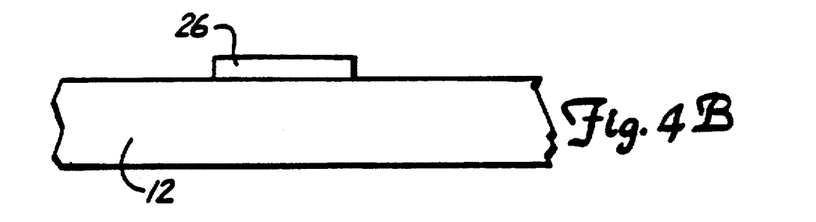

FIG. 4B shows substrate 12 of FIG. 4A including lower pole tip 26 deposited upon substrate 12 using photolithographic techniques. The view of FIG. 4B shows the width of lower pole tip 26.

Figure 4C:
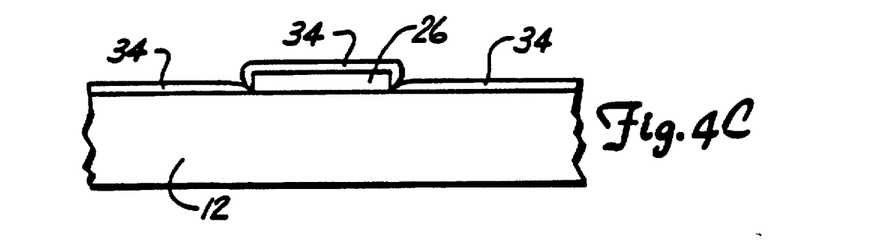

FIG. 4C depicts lower pole 26 including a layer of gap material 34 which also covers a portion of substrate 12. Gap material 34 typically comprises $Al_2O_3$.

Figure 4D:
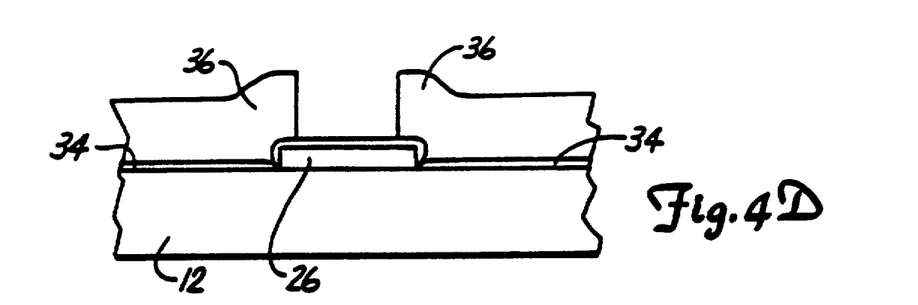
Figure 4E:
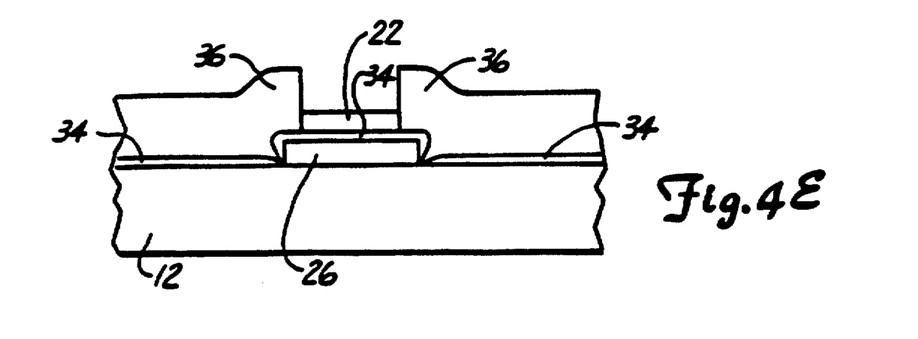
Figure 4F:
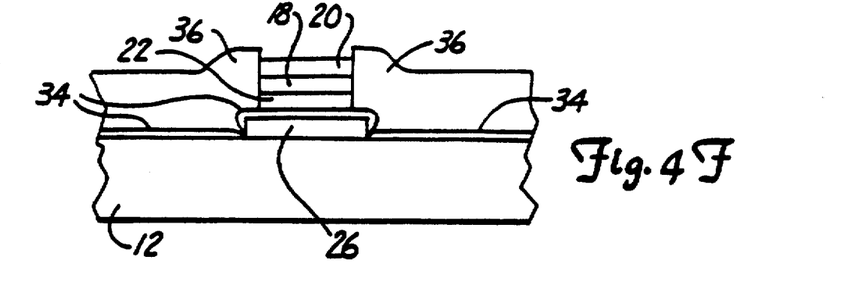
Figure 4G:
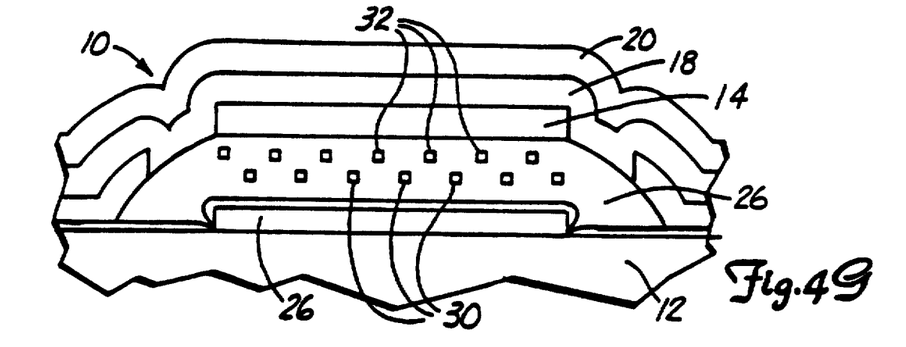

In FIG. 4D two photoresist dams 36 have been deposited upon gap material 34 while leaving uncovered the area where upper pole tip 22 will be deposited. Not shown in FIG. 4D is that photoresist dams 36 do not cover the entire surface shown in FIGS. 1 and 2 and leave exposed the portion of thin film head 10 where upper pole 14 is to be deposited. Photoresist 36 may be deposited using standard photolithographic and masking techniques. Upper pole 14 and upper pole tip 22 are then deposited in the area between photoresist dams 36 upon the exposed portion of gap material 34 as shown in FIG. 4E. FIG. 4F shows the pole tip region following deposition of sacrificial mask layers 18 and 20. FIG. 4G depicts a cross section of FIG. 1 taken in the middle portion of thin film head 10 along line 4G—4G following the deposition of sacrificial mask layers 18 and 20. The sacrificial mask layer 20 may comprise any platable on-magnetic metal. The sacrificial mask layers may be chosen, for example, to the milling correspond to the milling rates lower pole 26 and gap material 34, although other materials may also be employed.

FIG. 4G shows that thin film head 10 is completely covered and protected by sacrificial mask layers 18 and 20 everywhere except the area near the pole tip region where the exposed portion of gap material 34 and the exposed portion of lower pole tip 26 are to be removed, as shown in FIG. 3. Photoresist dams 36 shown in FIG. 4F are removed using a chemical etching process, which leaves the structure surrounding the pole tip area as shown in FIG. 3.

The second sacrificial mask layer may also be used to protect the coils during the milling process. The photoresist dams shown in FIG. 4D–4F actually extend around the entire paddle shape of the thin film head. Before the first sacrificial layer is deposited upon the upper pole tip, the portion of the dams that is not near the pole tips is removed by exposure to radiation followed by chemical development. The relief area left by this photoresist may then be covered over with the second sacrificial layer, to protect the coils as shown in FIG. 4G. Following milling, the second layer may then be removed.

The pole tip region shown in FIG. 3 (and consequently thin film head 10) is then exposed to a material removal ("milling") process in which the unprotected areas of thin film head 10 are milled away along with sacrificial layers 18 and 20. The milling process preferably comprises ion milling, in which argon or xenon ions are produced by an ion source and accelerated by an electric field through an electrified grid. Other ion sources may be used, as well as reactive ion milling in which the milling ions react with the milled material. Chemical etching or sputter etching may also be used for material removal. The energetic ions produced by the ion milling device bombard the surface of magnetic thin film head 10, to remove a portion of the material they impact. This milling process removes the exposed areas of gap material 34 and lower pole tip 26 as well as sacrificial layers 18 and 20. Sacrificial layers 18 and 20 must have a thickness and a milling rate so that thin film head 10 and upper pole tip 22 are protected during the milling process. In this example, the materials comprising masks 18 and 20 are chosen to correspond to lower pole tip 26 and gap material 34.

Figure 4H:
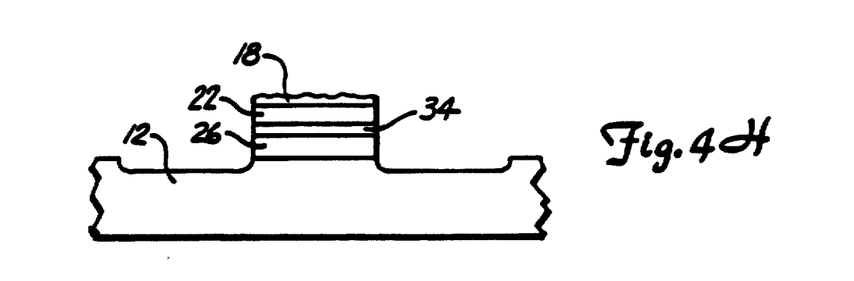

Following the milling procedure, the resultant pole tip structure is shown in FIG. 4H. The non-aligned portions of gap material 34 and lower pole tip 26 have been removed by the milling process. The milling process also removes all of sacrificial layer 20 along with the majority of sacrificial layer 18 when the thickness and milling rate of layers 18 and 20 is optimized. If desired, the remaining portion of sacrificial layer 18 may be removed through a process such as chemical etching.

Figure 5:
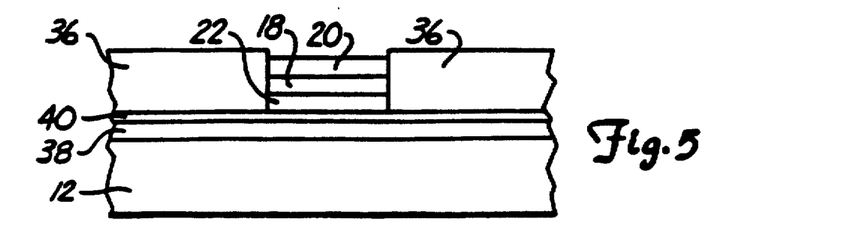
FIG. 5 is a cross sectional view of a pole tip region similar to FIG. 4F in which the bottom pole and gap material have "infinite width."

The present invention may also be used when the lower pole tip and gap material have "infinite width." In FIG. 5, a cross section of a pole tip region having an infinite width lower pole tip 38 and gap material 40 is shown. Upper pole tip 22, sacrificial mask layers 18 and 20 and photoresist dams 36 are deposited as described above. Photoresist dams 36 are then chemically etched to leave the non-aligned portion of lower pole tip 38 and gap material 40 exposed and the aligned portion of lower pole tip 38 and gap material 40 covered by upper pole tip 22 and sacrificial layers 18 and 20. A milling process is then applied as described above, and the non-aligned, exposed portions of gap material 40 and lower pole tip 38 are milled away while upper pole tip 22, the aligned portions of gap material 40 and lower pole tip 38 are protected by sacrificial layers 18 and 20. The pole tip structure resulting from the milling process is similar to that shown in FIG. 4H.

Figure 6:
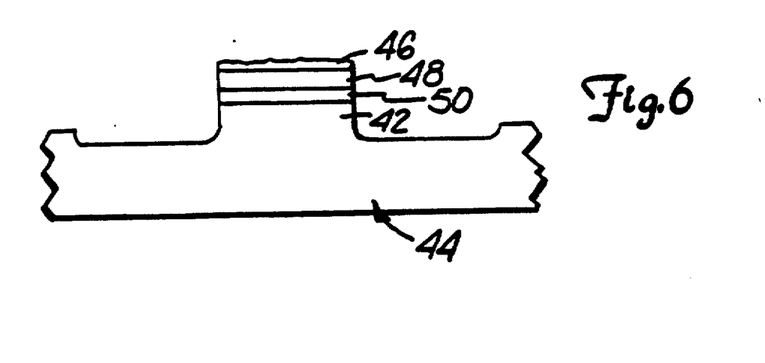
FIG. 6 is a cross sectional view of a pole tip region similar to FIG. 4F in which the bottom pole has "infinite width" and is formed from the substrate material.

FIG. 6 shows a pole tip structure comprising lower pole 42 formed in substrate 44 using the present invention. In FIG. 6, substrate 44 comprises magnetic ferrite. In a milling step, lower pole tip 42 is formed in substrate 44 because a sacrificial mask layer 46 protects an upper pole 48. A gap material layer 50 and the lower pole 42. Sacrificial mask layer 46 is formed using the self alignment techniques of the present invention.

The present invention produces thin film head pole tips in vertical alignment which have similar widths. Even if the accuracy of the alignment between upper and lower pole tips is poor due to the accuracy and definition of the deposition technique, the present invention provides a method to shape the pole tips and gap material so that these deficiencies are overcome. The present invention reduces time and provides cost savings in this shaping process. Because only two layers (the gap material layer and the lower pole tip layer) are milled with the present invention, milling times are reduced along with mask thickness. Manufacturing time and cost are also reduced with the present invention because only a single pair of photoresist dams are used to form both the upper pole tip and the sacrificial mask.

Although the present invention has been described with reference to preferred embodiments, workers skilled in the art will recognize that changes may be made in form and detail without departing from the spirit and scope of the invention. For example, different sacrificial mask materials and thicknesses may be used along with various milling and etching techniques.

What is claimed is:

1. A method of manufacturing a thin film magnetic transducer comprising:
   forming a first magnetic layer upon a nonmagnetic substrate;
   forming a gap material layer upon the first magnetic layer;
   depositing a layer having an aperture of a defined structure upon the gap material layer;
   forming a second magnetic layer over the gap layer and in the aperture;
   depositing a sacrificial mask layer upon the second magnetic layer and in the aperture;
   removing the layer having an aperture, exposing a portion of the gap material layer and a portion of the first magnetic layer; and
   exposing the thin film magnetic transducer to a material removal process.

2. The method of claim 1 wherein depositing the sacrificial mask layer comprises depositing nickel phosphorus.

3. The method of claim 1 wherein depositing the sacrificial mask layer comprises depositing nickel iron.

4. The method of claim 1 wherein depositing the sacrificial mask layer comprises depositing a first and a second sacrificial mask layer, the first sacrificial mask layer sandwiched between the second sacrificial mask layer and the second magnetic layer.

5. The method of claim 1 wherein the material removal process comprises ion milling.

6. The method of claim 1 wherein the material removal process comprises reactive ion milling.

7. The method of claim 1 wherein the material removing process comprises sputter etching.

8. The method of claim 1 wherein the first magnetic layer has a thickness in a range from about 1 micron to about 5 microns.

9. The method of claim 1 wherein the second magnetic layer has a thickness in a range from about 1 micron to about 5 microns.

10. The method of claim wherein the gap material layer has a thickness in a range from about 0.1 microns to about 1 micron.

11. The method of claim wherein the sacrificial mask layer has a thickness in a range from about 1 micron to about 7 microns.

12. The method of claim wherein the first magnetic layer has a thickness in a range from about 1 micron to about 5 microns, the gap material layer has a thickness in a range from about 0.1 microns to about 1 micron and the sacrificial mask layer has a thickness in a range from about 1 micron to about 7 microns.

13. A thin film magnetic transducer formed by the method defined in claim 1.

14. A method of manufacturing a thin film magnetic transducer comprising:
    depositing a first magnetic layer upon a nonmagnetic substrate;
    forming a gap material layer upon the first magnetic layer;
    depositing a second magnetic layer upon the gap material layer;
    forming a sacrificial mask layer over the second magnetic layer and in self alignment with the second magnetic layer; and
    exposing the thin film magnetic transducer to a material removal process.

15. The method of claim 14 wherein depositing the sacrificial mask layer comprises depositing nickel phosphorus.

16. The method of claim 14 wherein depositing the sacrificial mask layer comprises depositing nickel iron.

17. The method of claim 14 wherein depositing the sacrificial mask layer comprises depositing a first and a second sacrificial mask layer, the first sacrificial mask layer sandwiched between the second sacrificial mask layer and the second magnetic layer.

18. The method of claim 14 wherein exposing the thin film magnetic transducer to a material removal comprises ion milling.

19. The method of claim 14 wherein exposing the thin film magnetic transducer to a material removal comprises reactive ion milling.

20. The method of claim 14 wherein exposing the thin film magnetic transducer to a material removal comprises sputter etching.

21. The method of claim 14 wherein the first magnetic layer has a thickness in a range from about 1 micron to about 5 microns.

22. The method of claim 14 wherein the second magnetic layer has a thickness in a range from about 1 micron to about 5 microns.

23. The method of claim 14 wherein the gap material layer has a thickness in a range from about 0.1 to microns to about 1 micron.

24. The method of claim 14 wherein the sacrificial mask layer has a thickness in a range from about 1 micron to about 7 microns.

25. The method of claim 14 wherein the first magnetic layer has a thickness in a range from about 1 micron to about 5 microns, the gap material layer has a thickness in a range from about 0.1 microns to about 1 micron and the sacrificial mask layer has a thickness in a range from about 1 micron to about 7 microns.

26. A thin film magnetic transducer formed by the method defined in claim 14.

27. A method of manufacturing a thin film magnetic transducer of the type having a main body region and a pole tip region, comprising:
    depositing a first magnetic layer forming a portion of the main body region and a portion of the pole tip region upon a substrate;
    depositing a gap material layer upon first magnetic layer in the pole region;
    depositing a nonmagnetic insulator upon the first magnetic layer in main body region, the nonmagnetic insulator layer carrying a plural of electrical conductors therethrough;
    depositing a layer having an aperture of a defined structure;
    depositing a second magnetic layer upon the gap material layer in the aperture and upon the magnetic insulator layer;
    removing the layer having an aperture from the nonmagnetic insulator layer;
    depositing a sacrificial mask layer;
    removing the layer having an aperture from the gap material layer; and
    exposing the thin film magnetic transducer to a material removal process to remove exposed material.

28. The method of claim 27 wherein depositing the sacrificial mask layer comprises depositing nickel phosphorus.

29. The method of claim 27 wherein depositing the sacrificial mask layer comprises depositing nickel iron.

30. The method of claim 27 wherein depositing the sacrificial mask layer comprises depositing a first and a second sacrificial mask layer, the first sacrificial mask layer sandwiched between the second sacrificial mask layer and the second magnetic layer.

31. The method of claim 27 wherein exposing the thin film magnetic transducer to a material removal comprises ion milling.

32. The method of claim 27 wherein exposing the thin film magnetic transducer to a material removal comprises reactive ion milling.

33. The method of claim 27 wherein exposing the thin film magnetic transducer to a material removal comprises sputter etching.

34. The method of claim 27 wherein the first magnetic layer has a thickness in a range from about 1 micron to about 5 microns.

35. The method of claim 27 wherein the second magnetic layer has a thickness in a range from about 1 micron to about 5 microns.

36. The method of claim 27 wherein the gap material layer has a thickness in a range from about 0.1 microns to about 1 micron.

37. The method of claim 27 wherein the sacrificial mask layer has a thickness in a range from about 1 micron to about 7 microns.

38. The method of claim 27 wherein the first magnetic layer has a thickness in a range from about 1 micron to about 5 microns, the gap material layer has a thickness in a range from about 0.1 microns to about 1 micron and the sacrificial mask layer has a thickness in a range from about 1 micron to about 7 microns.

39. A thin film magnetic transducer formed by the method of claim 27.

40. A method of manufacturing a thin film magnetic transducer comprising:
    depositing a gap material layer upon a magnetic substrate;
    depositing a second magnetic layer upon the gap material layer;
    forming a sacrificial mask layer over the second magnetic layer and in self alignment with the second magnetic layer; and
    exposing the thin film magnetic transducer to a material removal process.

41. The method of claim 40 wherein depositing the sacrificial mask layer comprises depositing nickel phosphorus.

42. The method of claim 40 wherein depositing the sacrificial mask layer comprises depositing nickel iron.

43. The method of claim 40 wherein depositing the sacrificial mask layer comprises depositing a first and a second sacrificial mask layer, the first sacrificial mask layer sandwiched between the second sacrificial mask layer and the second magnetic layer.

44. The method of claim 40 wherein exposing the thin film magnetic transducer to a material removal comprises ion milling.

45. The method of claim 40 wherein exposing the thin film magnetic transducer to a material removal comprises reactive ion milling.

46. The method of claim 40 wherein exposing the thin film magnetic transducer to a material removal comprises sputter etching.

47. The method of claim 40 wherein the first magnetic layer has a thickness in a range from about 1 micron to about 5 microns.

48. The method of claim 40 wherein the second magnetic layer has a thickness in a range from about 1 micron to about 5 microns.

49. The method of claim 40 wherein the gap material layer has a thickness in a range from about 0.1 microns to about 1 micron.

50. The method of claim 40 wherein the sacrificial mask layer has a thickness in a range from about 1 micron to about 7 microns.

51. The method of claim 40 wherein the first magnetic layer has a thickness in a range from about 1 micron to about 5 microns, the gap material layer has a thickness in a range from about 0.1 microns to about 1 micron and the sacrificial mask layer has a thickness in a range from about 1 micron to about 7 microns.

52. A thin film magnetic transducer formed by the method defined in claim 40.

* * * * *

UNITED STATES PATENT AND TRADEMARK OFFICE
CERTIFICATE OF CORRECTION

PATENT NO. : 4,992,901

DATED : February 12, 1991

INVENTOR(S) : Beat Keel et al.

It is certified that error appears in the above-identified patent and that said Letters Patent is hereby corrected as shown below:

Col. 6, line 63, delete "claim", insert --claim 1--.

Col. 6, delete line 66, insert the following:

--11. The method of claim 1 wherein the sacrificial mask layer has a thickness in a range from about 1 micron to about 7 microns.--.

Col. 7, line 1, delete "claim", insert --claim 1--.

Col. 7, after line 66, insert the following:

--depositing a gap material layer upon the first magnetic layer in the pole tip region;--.

UNITED STATES PATENT AND TRADEMARK OFFICE
CERTIFICATE OF CORRECTION

PATENT NO. : 4,992,901

DATED : February 12, 1991

INVENTOR(S) : Beat Keel et al.

It is certified that error appears in the above-identified patent and that said Letters Patent is hereby corrected as shown below:

Col. 8, after line 64, insert the following:

--exposing the thin film magnetic transducer to a material removal process.--.

Signed and Sealed this

Twenty-first Day of July, 1992

*Attest:*

DOUGLAS B. COMER

*Attesting Officer*   *Acting Commissioner of Patents and Trademarks*